(12) United States Patent
Bang

(10) Patent No.: US 6,337,695 B1
(45) Date of Patent: Jan. 8, 2002

(54) CIRCUIT FOR CONTROLLING A CONTRAST LEVEL AND COMPENSATING A BRIGHTNESS LEVEL OF A VIDEO DISPLAY APPARATUS AND METHOD THEREFOR

(75) Inventor: Jeong-Ho Bang, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/419,299

(22) Filed: Oct. 15, 1999

(30) Foreign Application Priority Data

Dec. 8, 1998 (KR) .............................. 98-53675

(51) Int. Cl.[7] .................. G01N 27/74; G01R 33/12
(52) U.S. Cl. .................. 345/690; 345/10; 345/11; 348/655; 348/687
(58) Field of Search .............. 345/204, 10.29, 345/690; 315/383; 348/687, 655

(56) References Cited

U.S. PATENT DOCUMENTS 6,091,397 A * 7/2000 Lee ............................ 345/147

* cited by examiner

Primary Examiner—Steven Saras
Assistant Examiner—Christopher J. Maier
(74) Attorney, Agent, or Firm—Robert E. Bushnell, Esq.

(57) ABSTRACT

A circuit for compensating a brightness level of a video display apparatus capable of simplifying a circuit configuration and reducing a cost of production by placing a brightness level compensation circuit for the video display apparatus is disclosed. Microprocessor memorizes a predetermined data for a brightness level compensation and outputs a data signal and a clock signal based on the data for the brightness level compensation. Video pre-amplifier receives a video signal and horizontal and vertical fly-back pulse signals from an outside and controls a contrast level and compensates a brightness level of the video signal in accordance with the data signal and the clock signal to output a compensated video signal. Accordingly, the design of the brightness level compensation circuit is simplified and the size of the printed circuit board is reduced. In addition, the cost of production decreases and the productivity of products increases by reducing a number of components of the brightness level compensation circuit.

13 Claims, 3 Drawing Sheets

CIRCUIT FOR CONTROLLING A CONTRAST LEVEL AND COMPENSATING A BRIGHTNESS LEVEL OF A VIDEO DISPLAY APPARATUS AND METHOD THEREFOR

CLAIM OF PRIORITY

This application makes reference to, incorporates the same herein, and claims all benefits accruing under 35 U.S.C §119 from an application entitled Circuit For Compensating A Brightness Level Of A Video Display earlier filed in the Korean Industrial Property Office on Dec. 8, 1998, and there duly assigned Serial No. 98-53675 by that Office.

BACKGROUND OF THE INVENTION

Field of the Invention

The present invention relates to a brightness level compensation of a video display apparatus, and more particularly, to a circuit for controlling a contrast level and compensating a brightness level of a video display apparatus capable of simplifying a circuit configuration and reducing a cost of production by placing a brightness level compensation circuit in a video pre-amplifier for improving a brightness deflection of an image displayed in the peripheral regions of a display screen of the video display apparatus.

Description of the Prior Art

In general, images displayed on a video display apparatus, such as a monitor of a computer system, have a different brightness according to the display positions of the images on the screen.

That is, fluorescent materials arranged on a center portion of a fluorescent screen of the video display apparatus such as a cathode-ray tube has a smaller size than fluorescent materials arranged on upper, lower, left and right portions of the fluorescent screen of the video display apparatus. Also, a glass thickness of the upper, lower, left and right portions of the fluorescent screen is thicker than the glass thickness of the center portion thereof.

Accordingly, the brightness of respective portions of the image displayed through the fluorescent screen is not uniform. Therefore, when the brightness of the image controlled by a brightness control signal at the center portion is also controlled by the same brightness control signal at the peripheral display portions of the screen, the image displayed at the peripheral portions is darker than the image at the center portion. That is, a brightness deflection occurs.

To improve the brightness deflection as described above, an apparatus having a compensation circuit which supplies a control signal for compensating the brightness deflection had been contemplated. However, since such a compensation circuit for the brightness deflection compensation is arranged on a printed circuit board separate from a video pre-amplifier, the circuit configuration becomes complicated and the cost of production largely increases.

SUMMARY OF THE INVENTION

Therefore, it is an object of the present invention to provide a circuit for compensating a brightness level of a video display apparatus capable of simplifying a circuit configuration and reducing a cost of production by placing a brightness level compensation circuiting a video pre-amplifier of the video display apparatus for improving a brightness deflection of an image displayed on a peripheral portion of a screen.

It is another object of the present invention to provide a circuit for controlling a contrast level and compensating a brightness level of a video signal displayed in a video display apparatus having a simplified circuit configuration and reduced cost of production by placing contrast controller and a brightness level compensation circuit in a video pre-amplifier of the video display apparatus for improving the contrast level and a brightness deflection of an image displayed on a peripheral portion of a screen.

In order to achieve the above objects, the present invention provides a circuit for compensating a brightness level of a video display apparatus having a microprocessor for memorizing a predetermined data for a brightness level compensation and outputting a data signal and a clock signal based on the predetermined data for the brightness level compensation, and a video pre-amplifier for receiving a video signal and horizontal and vertical fly-back pulse signals and compensating a contrast level and a brightness level of the video signal in accordance with the data signal and the clock signal to output a compensated video signal.

In order to achieve the above objects, the present invention provides a circuit for compensating a brightness level of a video display apparatus having a microprocessor for memorizing a predetermined data for a brightness level compensation and outputting a data signal and a clock signal based on the data for the brightness level compensation, a video pre-amplifier having a digital controller for outputting a first control signal to control the contrast level of the video signal and a second control signal to compensate the brightness level of the video signal in response to the data signal and the clock signal, a brightness level controller for receiving the horizontal and vertical fly-back pulse signals and outputting a brightness level compensation signal to compensate the brightness level of the video signal in response to the second control signal, and a contrast controller for controlling the contrast level in response to the first control signal and compensating the brightness level of the video signal in response to the brightness level compensation signal to output the compensated video signal.

According to the circuit for compensating the brightness level of the video display apparatus of the present invention, the brightness level compensation circuit for compensating the brightness deflection of each portion of the screen is arranged in the video pre-amplifier of the printed circuit board.

Accordingly, the design of the brightness level compensation circuit is simplified and the size of the printed circuit board is reduced. In addition, the cost of production decreases and the is productivity of products increases by reducing a number of components of the brightness level compensation circuit.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings, wherein.

DESCRIPTION OF THE PREFERRED EMBODIMENT

A description will be given below in detail with reference to the accompanying drawings to a configuration and an operation of the circuit for compensating the brightness level of the video display apparatus according to an embodiment of the present invention.

Figure 1:
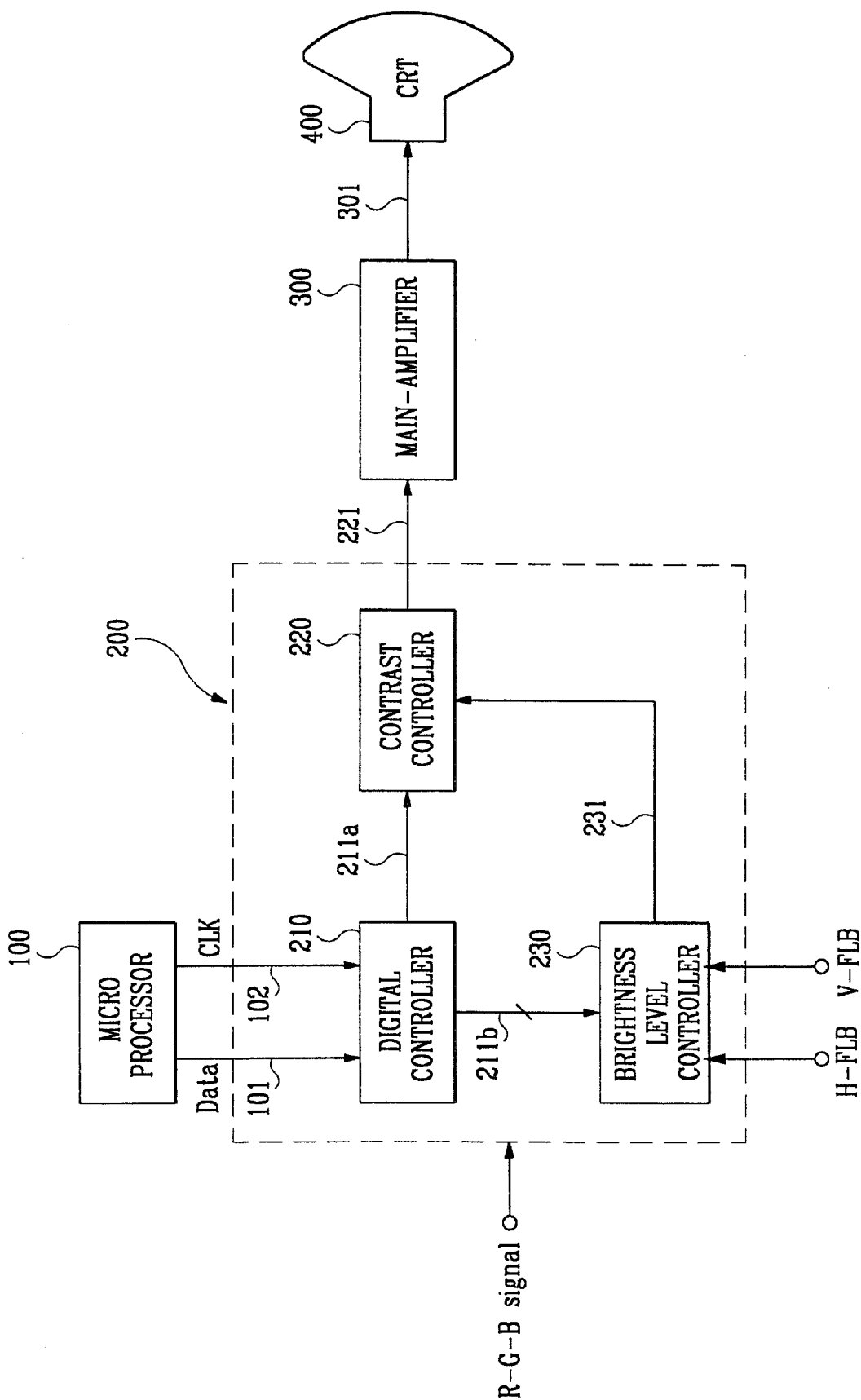
FIG. 1 is a block diagram showing the configuration of a circuit for controlling a contrast level of a video signal and compensating a brightness level of a video display apparatus according to an embodiment of the present invention.

FIG. 1 is a block diagram showing the configuration of a circuit for compensating a brightness level of a video display apparatus according to an embodiment of the present invention.

Referring to FIG. 1, the circuit for compensating the brightness level of the video display apparatus has a microprocessor 100 for outputting a data signal 101 and a clock signal 102 based on predetermined data for brightness level compensation, a video pre-amplifier 200 for receiving a video signal R-G-B and a horizontal fly-back pulse signal H-FLB and a vertical fly-back pulse signal V-FLB, compensating a contrast level and a brightness level of video signal R-G-B in response to data signal 101 and clock signal 102 and for outputting a compensated video signal 221, a main-amplifier amplifier 300 for amplifying compensated video signal 221, and a cathode-ray tube 400 for displaying a video signal 301 amplified by main-amplifier 300. Note that the compensated video signal is not limited to use with a cathode ray tube, but may be utilized with other well known display devices.

Here, video pre-amplifier 200 has a digital controller 210 for outputting first and second control signals 211a and 211b to respectively compensate the contrast level and the brightness level of video signal R-G-B in response to data signal 101 and clock signal 102, a brightness level controller 230 receives horizontal fly-back pulse signal H-FLB and vertical fly-back pulse signal V-FLB and outputs a brightness level compensation signal 231 to compensate the brightness level of video signal R-G-B in response to second control signal 211b, and a contrast controller 220 for respectively compensating the contrast level and the brightness level of video signal R-G-B in response to first control signal 211a and brightness level compensation signal 231 and outputting compensated video signal 221.

In addition, second control signal 211b includes horizontal and vertical gain control signals to control the gain values of horizontal fly-back pulse signal H-FLB and vertical fly-back pulse signal V-FLB, and horizontal and vertical balance control signals to control the balance of horizontal fly-back pulse signal H-FLB and vertical fly-back pulse signal V-FLB.

Hereinafter, the operation of the circuit for compensating the brightness level of the video display apparatus according to the embodiment of the present invention is illustrated in detail.

Figure 2:
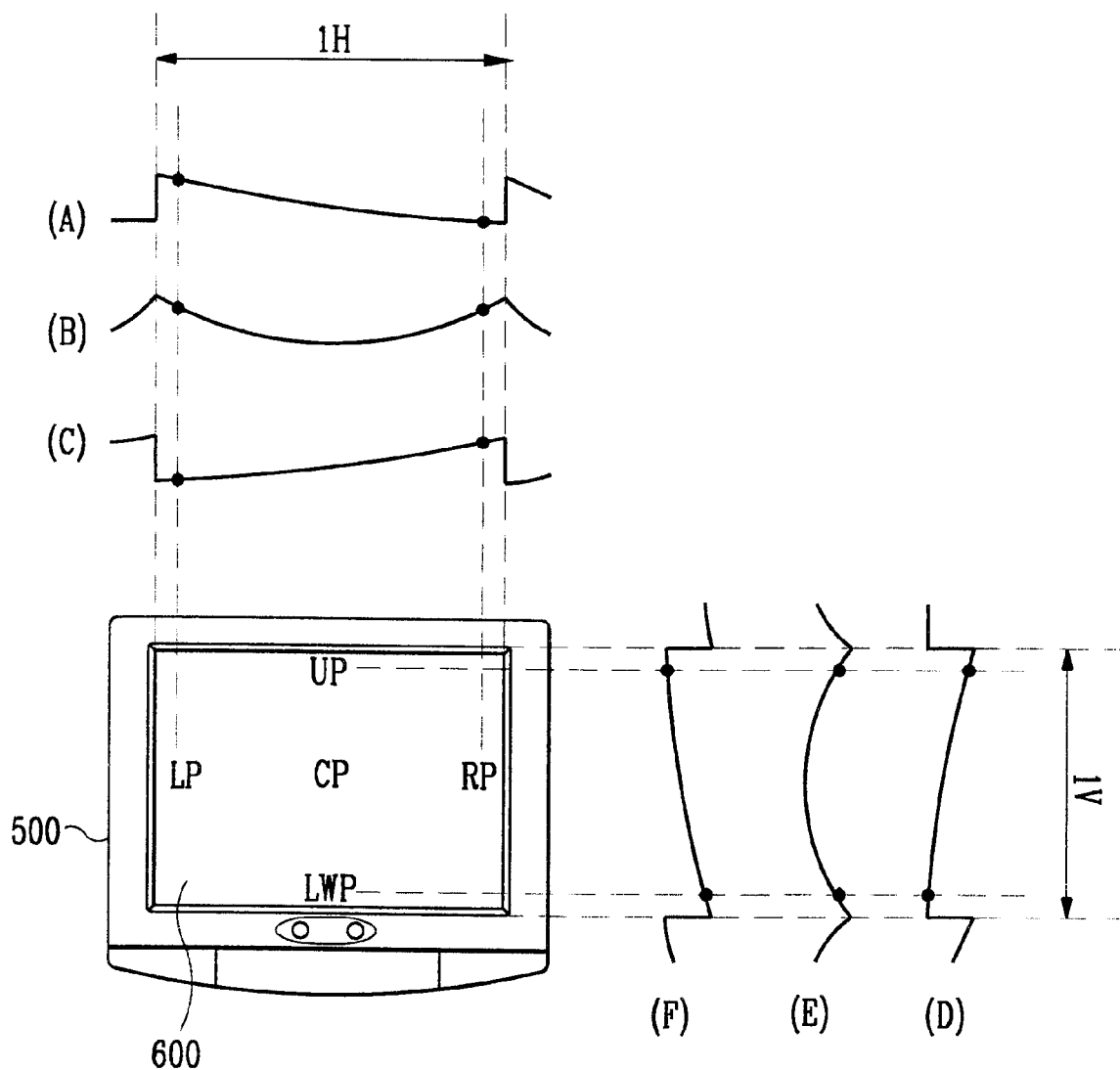
FIGS. 2 and 3 are waveform views showing waveforms of a brightness level compensation signal output from a brightness level controller shown in FIG. 1.
Figure 3:
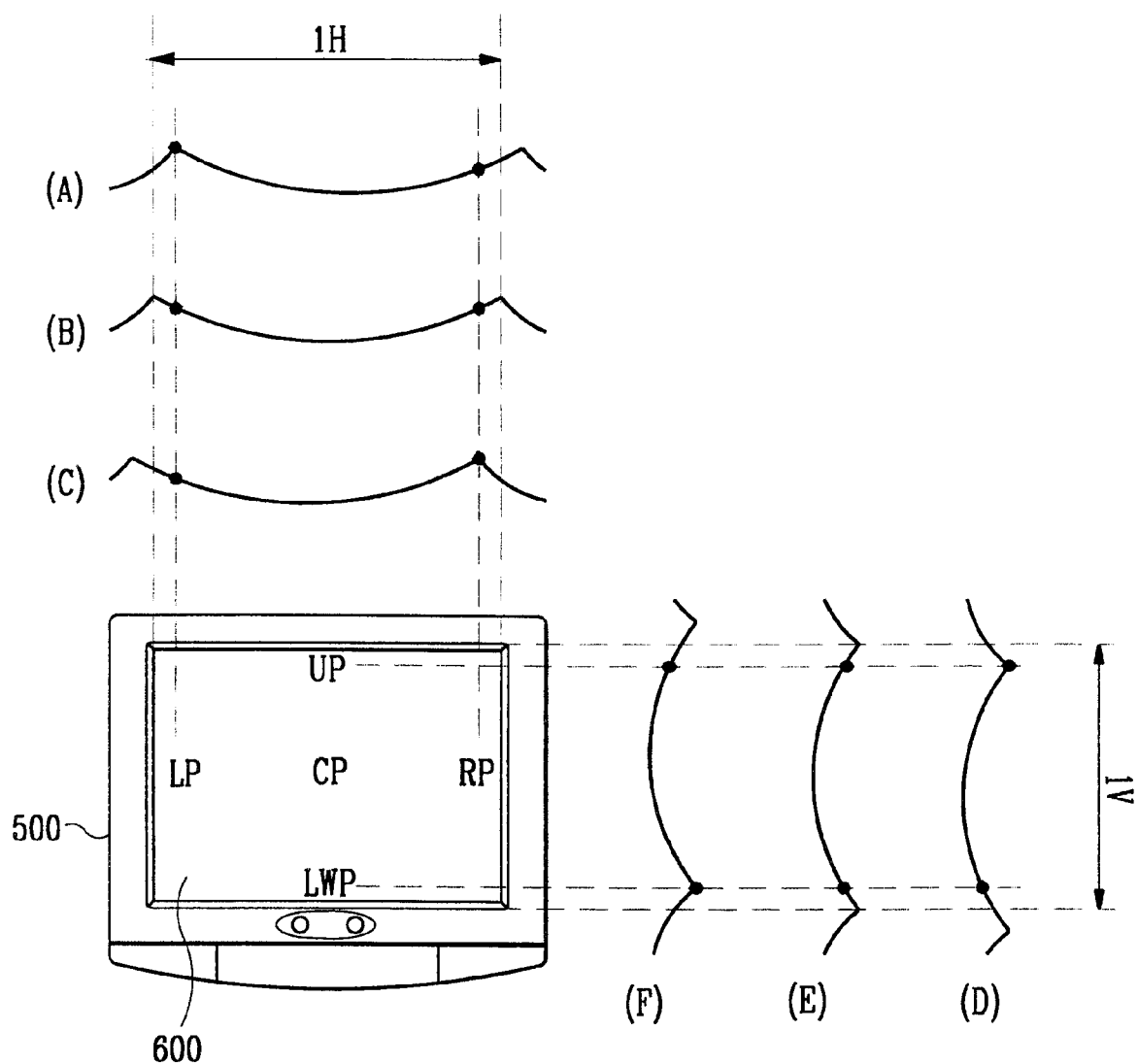

FIGS. 2 and 3 are waveform views showing waveforms of brightness level compensation signals output from brightness level controller shown in FIG. 1. First, microprocessor 100 memorizes the data for the brightness level compensation set in a manufacturing process of the video display apparatus. In other words, when the brightness level of one portion of screen 600 of video display apparatus is lower than other portions, a data value which represents the one portion is set in microprocessor 100 in the manufacturing process of video display apparatus 500.

When data signal 101 and clock signal 102 are output from microprocessor 100 based on the predetermined data for the brightness level compensation as described above, digital controller 210 s receives data signal 101 and clock signal 102 through an I²C synchronous serial bus. Digital controller 210, responsive to data signal 101 and clock signal 102, supplies first control signal 211a to control the contrast level of video signal R-G-B to contrast controller 220. Also, digital controller 210, responsive to data signal 101 and clock signal 102, supplies second control signal 211b to brightness level controller 230 to control the gain value and the balance of horizontal fly-back pulse signal H-FLB and vertical fly-back pulse signal V-FLB input to brightness level controller 230.

Brightness level controller 230 receives horizontal fly-back pulse signal H-FLB and vertical fly-back pulse signal V-FLB, controls the gain value and the balance of horizontal fly-back pulse signal H-FLB and vertical fly-back pulse signal V-FLB in response to second control signal 211b from digital controller 210, and supplies brightness level compensation signal 231 for compensating the brightness level of video signal R-G-B to contrast controller 220.

Here, the waveforms of brightness level compensation signal 231 output from brightness level controller 230 has the waveforms as shown in FIGS. 2 and 3.

That is, when left and right portions LP and RP of the image displayed on screen 600 are darker than a center portion CP, brightness level compensation signal 231 from brightness level controller 230 synchronizes with one period 1H of a horizontal scanning period and has a waveform as shown in a reference code (B) of FIG. 2 to compensate the brightness level of left and right portions LP and RP. Accordingly, since the brightness level of left and right portions LP and RP are more highly compensated than the brightness level of center portion CP, left and right portions LP and RP have the brightness level which is identical with the brightness level of center portion CP.

In the same manner, in a case where upper and lower portions UP and LWP are darker than center portion CP, brightness level compensation signal 231 from brightness level controller 230 synchronizes with one period 1V of a vertical scanning period and has a waveform as shown in a reference code (E) of FIG. 2 to compensate the brightness level of upper and lower portions UP and LWP. Accordingly, since the brightness level of upper and lower portions UP and LWP are more highly compensated than the brightness level of center portion CP, upper and lower portions UP and LWP have the brightness level which is identical with the brightness level of center portion CP.

If left portion LP of screen 600 is dark and right portion RP of screen 600 is bright, brightness level compensation signal 231 from brightness level controller 230 has a waveform as shown in a reference code (A) of FIG. 2.

On the contrary, if left portion LP of screen 600 is bright and right portion RP of screen 600 is dark, brightness level compensation signal 231 from brightness level controller 230 has a waveform as shown in a reference code (C) of FIG. 2.

In addition, if upper portion UP of screen 600 is dark and lower portion LWP of screen 600 is bright, brightness level compensation signal 231 from brightness level controller 230 has a waveform as shown in a reference code (D) of FIG. 2.

On the contrary, if upper portion UP of screen 600 is bright and lower portion LWP of screen 600 is dark, brightness level compensation signal 231 from brightness level controller 230 has a waveform as shown in a reference code (F) of FIG. 2.

FIG. 3 is a waveform view showing the waveforms of which brightness level compensation signal 231 from brightness level controller 230 is delayed by second control signal 211b from digital controller 210 during the predetermined time.

That is, when left and right portions LP and RP are darker than center portion CP, brightness level compensation signal 231 from brightness level controller 230 synchronizes with one period 1H of the horizontal scanning period and has a waveform as shown in a reference code (B) of FIG. 3 to compensate the brightness level of left and right portions LP and RP.

Accordingly, since the brightness level of left and right portions LP and RP are more highly compensated than the brightness level of center portion CP, left and right portions LP and RP have the brightness level which is identical with the brightness level of center portion CP.

In the same manner, when upper and lower portions UP and LWP are darker than center portion CP, brightness level compensation signal 231 from brightness level controller 230 synchronizes with one period 1V of vertical scanning period and has a waveform as shown in a reference code (E) of FIG. 3 to compensate the brightness level of upper and lower portions UP and LWP.

Accordingly, since the brightness level of upper and lower portions UP and LWP are more highly compensated than the brightness level of center portion CP, upper and lower portions UP and LWP have the brightness level which is identical with the brightness level of center portion CP.

If left portion LP of screen 600 is dark and right portion RP of screen 600 is bright, brightness level compensation signal 231 from brightness level controller 230 has a waveform as shown in a reference code (A) of FIG. 3.

On the contrary, if left portion LP of screen 600 is bright and right portion RP of screen 600 is dark, brightness level compensation signal 231 from brightness level controller 230 has a waveform as shown in a reference code (C) of FIG. 3.

In addition, if upper portion UP of screen 600 is dark and lower portion LWP of screen 600 is bright, brightness level compensation signal 231 from brightness level controller 230 has a waveform as shown in a reference code (D) of FIG. 3.

On the contrary, if upper portion UP of screen 600 is bright and lower portion LWP of screen 600 is dark, brightness level compensation signal 231 from brightness level controller 230 has a waveform as shown in a reference code (F) of FIG. 3.

Next, contrast controller 220 controls the contrast level of video signal R-G-B in accordance to first control signal 211a from digital controller 210. Also, contrast controller 220 compensates the brightness level of video signal R-G-B in accordance with brightness level compensation signal 231 from brightness level controller 230 and supplies compensated video signal 221 to main-amplifier 300. Main-amplifier 300 amplifies compensated video signal 221 from contrast controller 220 to supply amplified video signal 301 to cathode-ray tube 400. The amplified video signal 301 is displayed to the user through cathode-ray tube 400.

According to the circuit for compensation the brightness level of the video display apparatus of the present invention, the brightness level compensation circuit for compensating the brightness deflection of each of portions of the screen is arranged in the video pre-amplifier of the printed circuit board.

Accordingly, the design of the brightness level compensation circuit is simplified and the size of the printed circuit board is reduced. In addition, the cost of production decreases and the productivity of products increases by reducing a number of components of the brightness level compensation circuit.

While the present invention has been particularly shown and described with reference to a particular embodiment thereof, it will be understood by those skilled in the art that various changes in form and details may be effected therein without departing from the spirit and scope of the invention as defined by the appended claims.

what is claimed is:

1. A circuit for controlling a contrast level and compensating a brightness level of a video display apparatus, said apparatus comprising:
    a microprocessor for memorizing a predetermined data for a brightness level compensation and outputting a data signal and a clock signal based on the predetermined data for the brightness level compensation; and
    a video pre-amplifier for receiving a video signal and horizontal and vertical fly-back pulse signals and controlling a contrast level and compensating a brightness level of the video signal in accordance with the data signal and the clock signal to output a compensated video signal.

2. The circuit as set forth in claim 1, wherein said video pre-amplifier comprises:
    a digital controller for outputting a first control signal to control the contrast level of the video signal and a second control signal to compensate the brightness level of the video signal in response to the data signal and the clock signal;
    a brightness level controller for receiving the horizontal and vertical fly-back pulse signals and outputting a brightness level compensation signal to compensate the brightness level of the video signal in response to the second control signal; and
    a contrast controller for controlling the contrast level in response to the first control signal and compensating the brightness level of the video signal in response to the brightness level compensation signal to output the compensated video signal.

3. The circuit as set forth in claim 2, wherein the brightness level compensation signal from said brightness level controller is delayed during a predetermined time in accordance with the predetermined data for the brightness level compensation.

4. The circuit as set forth in claim 2, wherein the second control signal from digital controller includes horizontal and vertical gain control signals for controlling gain values of the horizontal and vertical fly-back pulse signals, and also includes horizontal and vertical balance control signals for controlling balance of the horizontal and vertical fly-back pulse signals.

5. A circuit for controlling a contrast level and compensating a brightness level of a video display apparatus, said apparatus comprising:
    a microprocessor for memorizing a predetermined data for a brightness level compensation and outputting a data signal and a clock signal based on the data for the brightness level compensation; and
    a video pre-amplifier comprising:
        a digital controller for outputting a first control signal to control the contrast level of the video signal and a second control signal to compensate the brightness level of the video signal in response to the data signal and the clock signal;
        a brightness level controller for receiving horizontal and vertical fly-back pulse signals and outputting a brightness level compensation signal to compensate the brightness level of the video signal in response to the second control signal; and
        a contrast controller for controlling the contrast level of the video signal in response to the first control signal and compensating the brightness level of the video signal in response to the brightness level compensation signal to output a compensated video signal.

6. The circuit as set forth in claim 5, wherein the brightness level compensation signal from said brightness level controller is delayed during a predetermined time in accordance with the predetermined data for the brightness level compensation.

7. The circuit as set forth in claim 5, wherein the second control signal from digital controller includes horizontal and vertical gain control signals for controlling gain values of the horizontal and vertical fly-back pulse signals, and also includes horizontal and vertical balance control signals for controlling a balance of the horizontal and vertical fly-back pulse signals.

8. A method for controlling a contrast level and compensating a brightness level of a video display apparatus, said method comprising the steps of:

storing predetermined data for brightness level compensation in a microprocessor during manufacture of said video display apparatus;

outputting a data signal and a clock signal from said microprocessor based on said predetermined data; and outputting a compensated video signal from a preamplifier by receiving a video signal, a horizontal fly-back pulse signal and a vertical fly-back pulse signal and controlling the contrast level of the video signal and compensating the brightness level of the video signal in accordance with the data signal and the clock signal.

9. The method as set forth in claim 8, said step of outputting a compensated video signal comprises steps of:

outputting a first control signal to control the contrast level of the video signal and a second control signal to compensate the brightness level of the video signal in response to the data signal and the clock signal;

receiving the horizontal and vertical fly-back pulse signals and outputting a brightness level compensation signal to compensate the brightness level of the video signal in response to the second control signal; and controlling the contrast level in response to the first control signal and compensating the brightness level of the video signal in response to the brightness level compensation signal to output the compensated video signal.

10. The method as set forth in claim 9, further comprising a step of delaying the outputting of the brightness level compensation signal during a predetermined time in accordance with the predetermined data for the brightness level compensation.

11. The method as set forth in claim 9, wherein the brightness level compensation signal has a predetermined waveform according to the predetermined data for the brightness level compensation.

12. The method as set forth in claim 11, further comprising a step of delaying the outputting of the brightness level compensation signal during a predetermined time in accordance with the predetermined data for the brightness level compensation.

13. The method as set forth in claim 11, further comprising a step of advancing the outputting of the brightness level compensation signal during a predetermined time in accordance with the predetermined data for the brightness level compensation.

* * * * *